(12) United States Patent
Ahn et al.

(10) Patent No.: US 12,191,539 B2
(45) Date of Patent: Jan. 7, 2025

(54) CARTRIDGE OF FUEL CELL HUMIDIFIER AND FUEL CELL HUMIDIFIER

(71) Applicant: KOLON INDUSTRIES, INC., Seoul (KR)

(72) Inventors: Woong Jeon Ahn, Seoul (KR); Young Seok Oh, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 494 days.

(21) Appl. No.: 17/762,350

(22) PCT Filed: Nov. 27, 2020

(86) PCT No.: PCT/KR2020/017071
§ 371 (c)(1),
(2) Date: Mar. 21, 2022

(87) PCT Pub. No.: WO2021/107679
PCT Pub. Date: Jun. 3, 2021

(65) Prior Publication Data
US 2022/0344684 A1 Oct. 27, 2022

(30) Foreign Application Priority Data
Nov. 29, 2019 (KR) .......................... 10-2019-0156901

(51) Int. Cl.
*H01M 8/04119* (2016.01)
*B01D 63/02* (2006.01)
(Continued)

(52) U.S. Cl.
CPC ...... *H01M 8/04126* (2013.01); *B01D 63/031* (2022.08); *H01M 8/0438* (2013.01); *H01M 8/2475* (2013.01); *H01M 2008/1095* (2013.01)

(58) Field of Classification Search
CPC ............ B01D 63/031; H01M 8/04126; H01M 8/0438; H01M 8/2475; H01M 2008/1095
(Continued)

(56) References Cited

U.S. PATENT DOCUMENTS

2004/0149645 A1   8/2004  Sunohara
2008/0237902 A1*  10/2008 Nagumo ................ B01D 53/22
                                                                261/104
(Continued)

FOREIGN PATENT DOCUMENTS

CN    102648547 A    8/2012
CN    103582969 A    2/2014
(Continued)

OTHER PUBLICATIONS

The search report dated Oct. 13, 2023 related to the corresponding European Patent application.
(Continued)

*Primary Examiner* — Charles S Bushey
(74) *Attorney, Agent, or Firm* — Harvest IP Law, LLP

(57) ABSTRACT

A cartridge of a fuel cell humidifier includes an inner case to be inserted into a middle case of the fuel cell humidifier for humidifying dry gas supplied from the outside using wet gas discharged from a fuel cell stack; a plurality of hollow-fiber membranes accommodated inside the inner case; a first potting part which is coupled to the inner case and which fixes one side of each of the hollow-fiber membranes; a second potting part which is coupled to the inner case and which fixes the other sides of the hollow-fiber membranes; and a link member for connecting the inner case to the middle case so that the middle case and the inner case are linked so as to move according to the pressure of the wet gas positioned inside the middle case.

15 Claims, 12 Drawing Sheets

(51) Int. Cl.
   *H01M 8/0438* (2016.01)
   *H01M 8/2475* (2016.01)
   *H01M 8/10* (2016.01)

(58) Field of Classification Search
   USPC .......................................................... 261/104
   See application file for complete search history.

(56) References Cited

U.S. PATENT DOCUMENTS

| | | | |
|---|---|---|---|
| 2009/0117415 A1 | 5/2009 | Leister | |
| 2009/0130495 A1* | 5/2009 | Terasaki | H01M 8/04141 261/104 |
| 2012/0231357 A1 | 9/2012 | Kim | |
| 2014/0186727 A1 | 7/2014 | Kim | |
| 2015/0050572 A1 | 2/2015 | Usuda | |
| 2016/0322654 A1 | 11/2016 | Koo | |
| 2023/0411650 A1* | 12/2023 | Oh | H01M 8/04119 |
| 2023/0420706 A1* | 12/2023 | Ahn | H01M 8/04126 |

FOREIGN PATENT DOCUMENTS

| | | |
|---|---|---|
| CN | 104169655 A | 11/2014 |
| CN | 106099142 A | 11/2016 |
| JP | 2009507350 A | 2/2009 |
| KR | 20130009031 A | 1/2013 |
| KR | 20140038223 A | 3/2014 |
| KR | 20140086217 A | 7/2014 |
| KR | 20180099034 A | 9/2016 |
| KR | 20180066418 A | 6/2018 |
| KR | 20190055635 A | 5/2019 |
| KR | 20190081736 A | 7/2019 |

OTHER PUBLICATIONS

The office action dated Nov. 28, 2023 related to the corresponding Chinese Patent application.
The office action dated Feb. 9, 2023 related to the corresponding Canadian Patent application.

* cited by examiner

【FIG. 2】
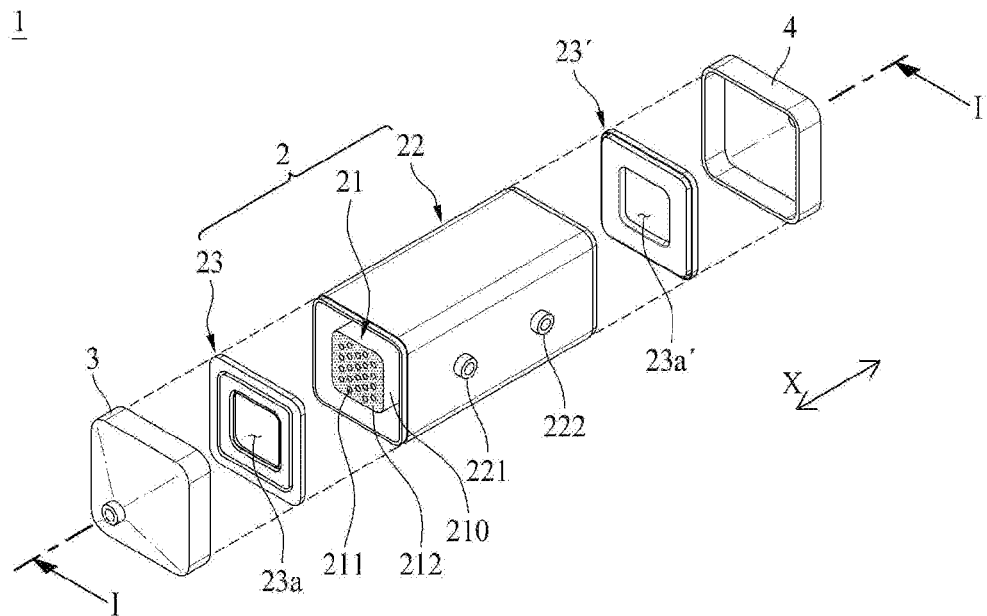
【FIG. 3】
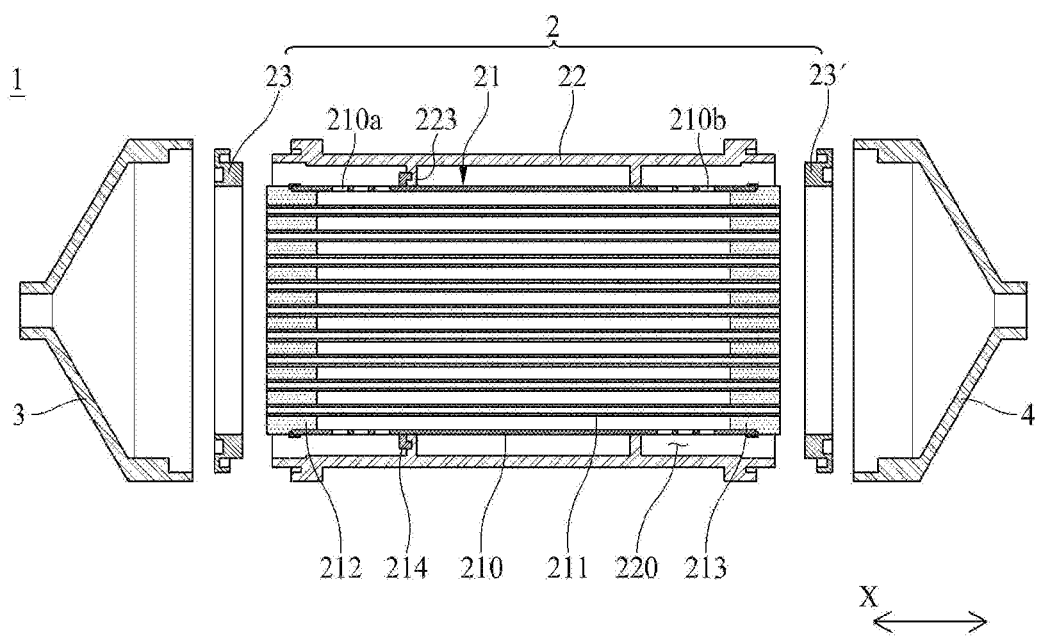

【FIG. 4】
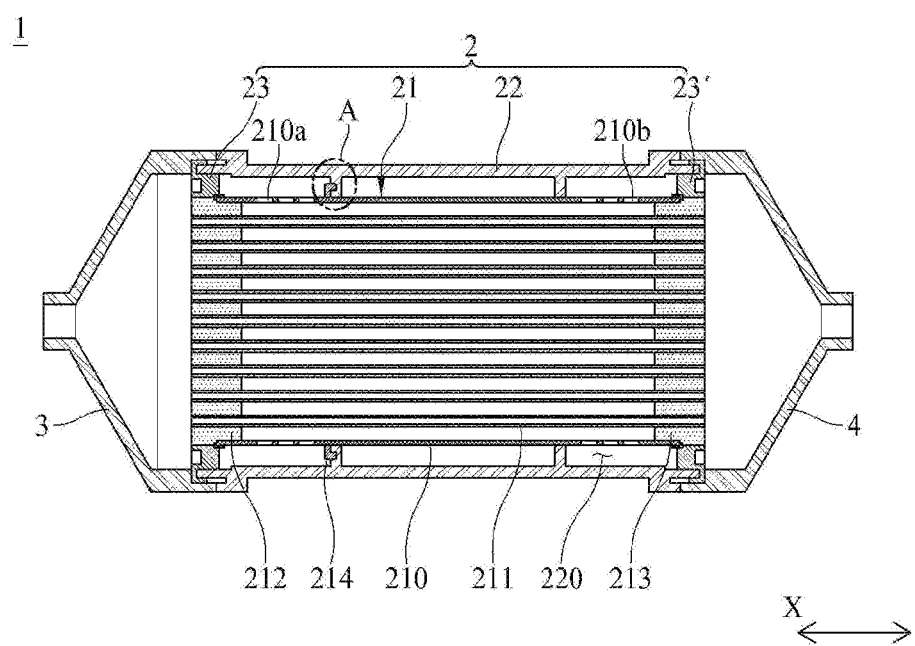

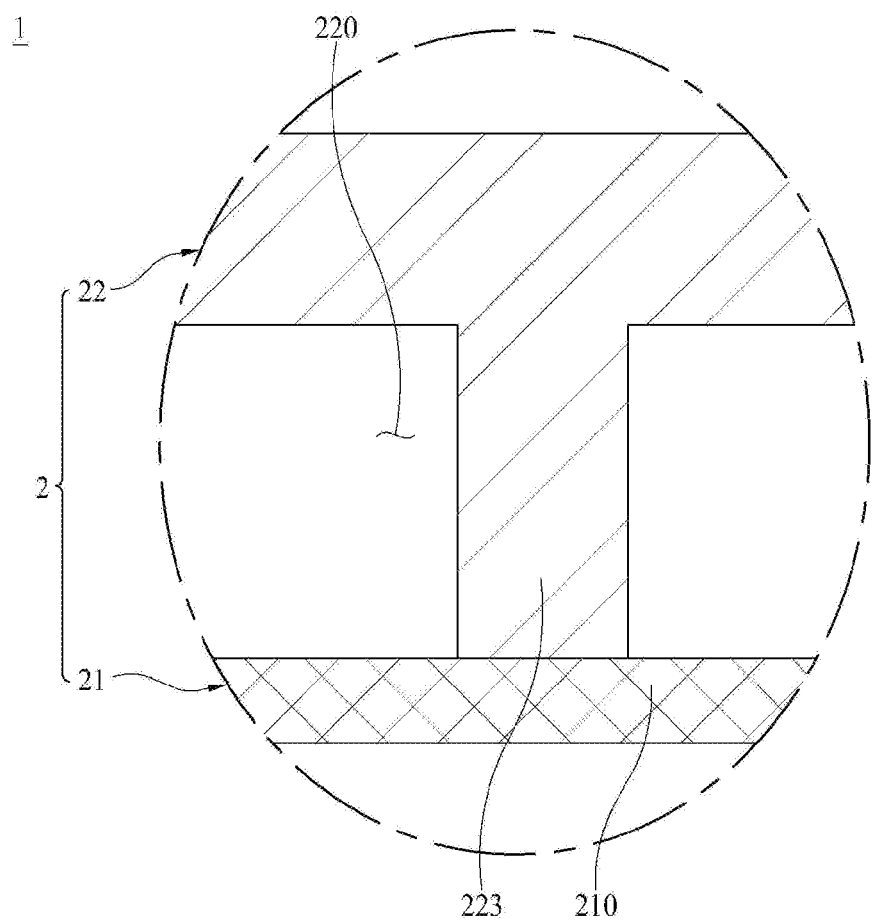
[FIG. 5]

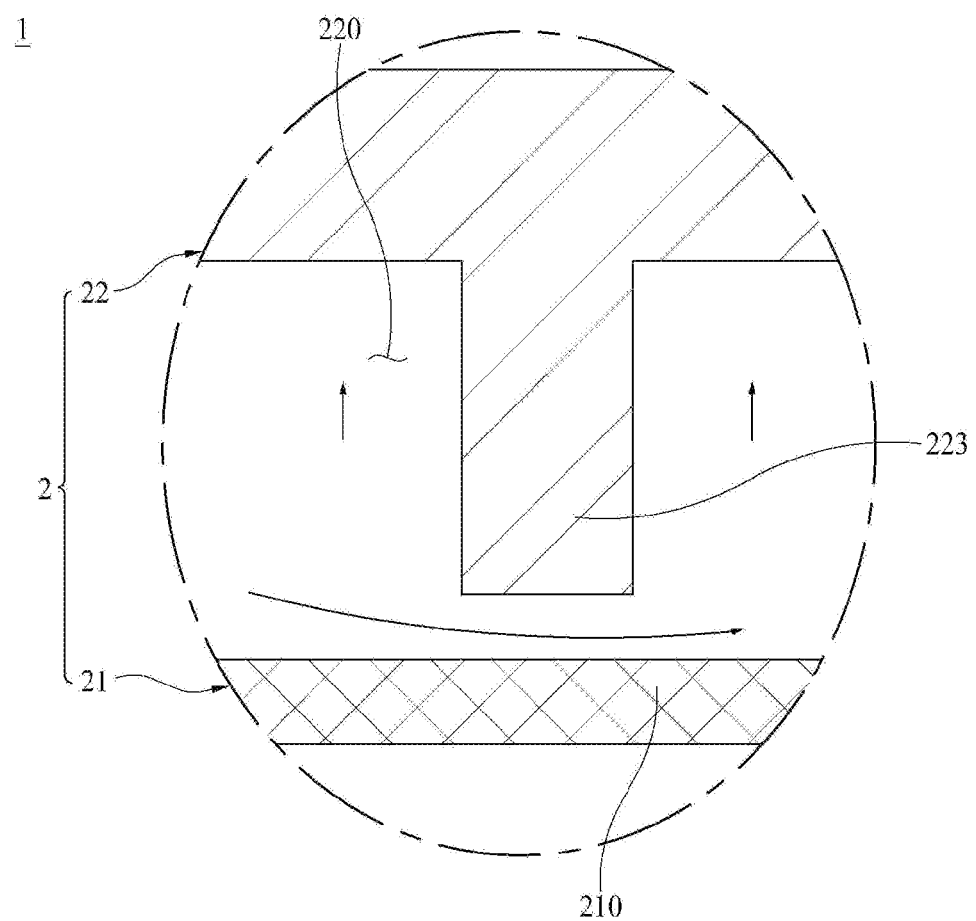
[FIG. 6]

[FIG. 7]
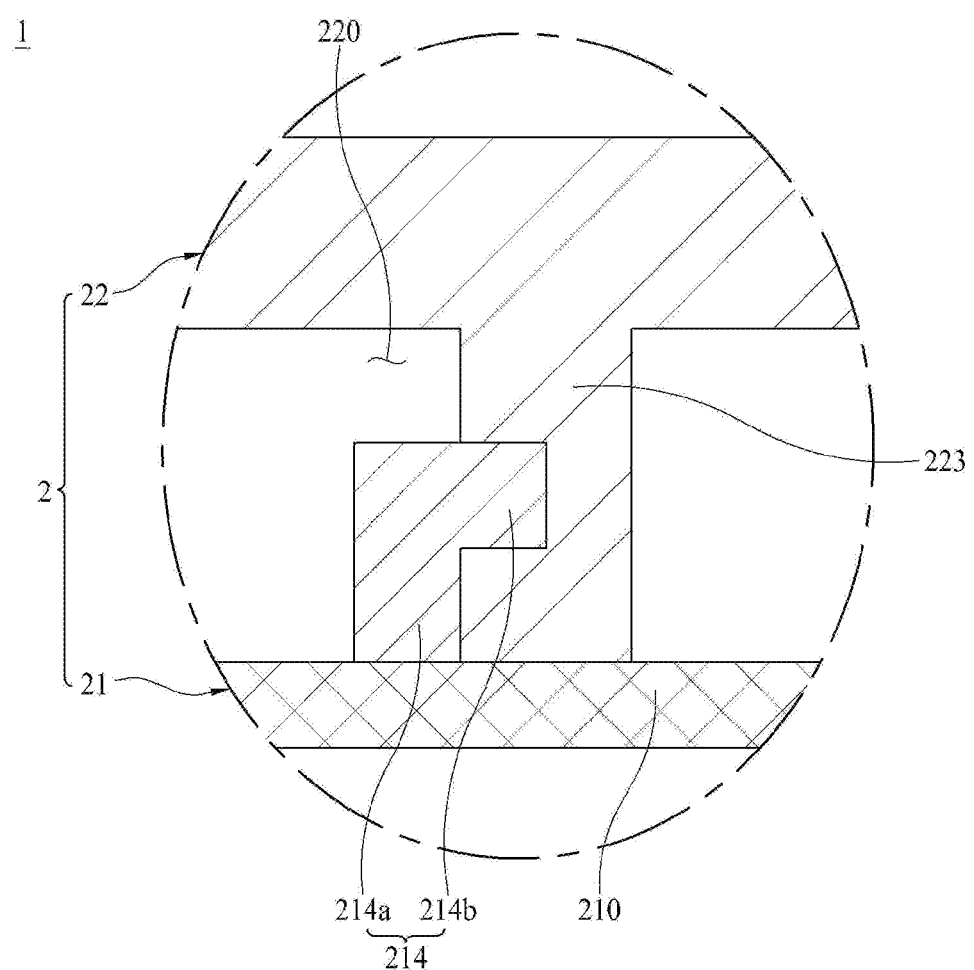

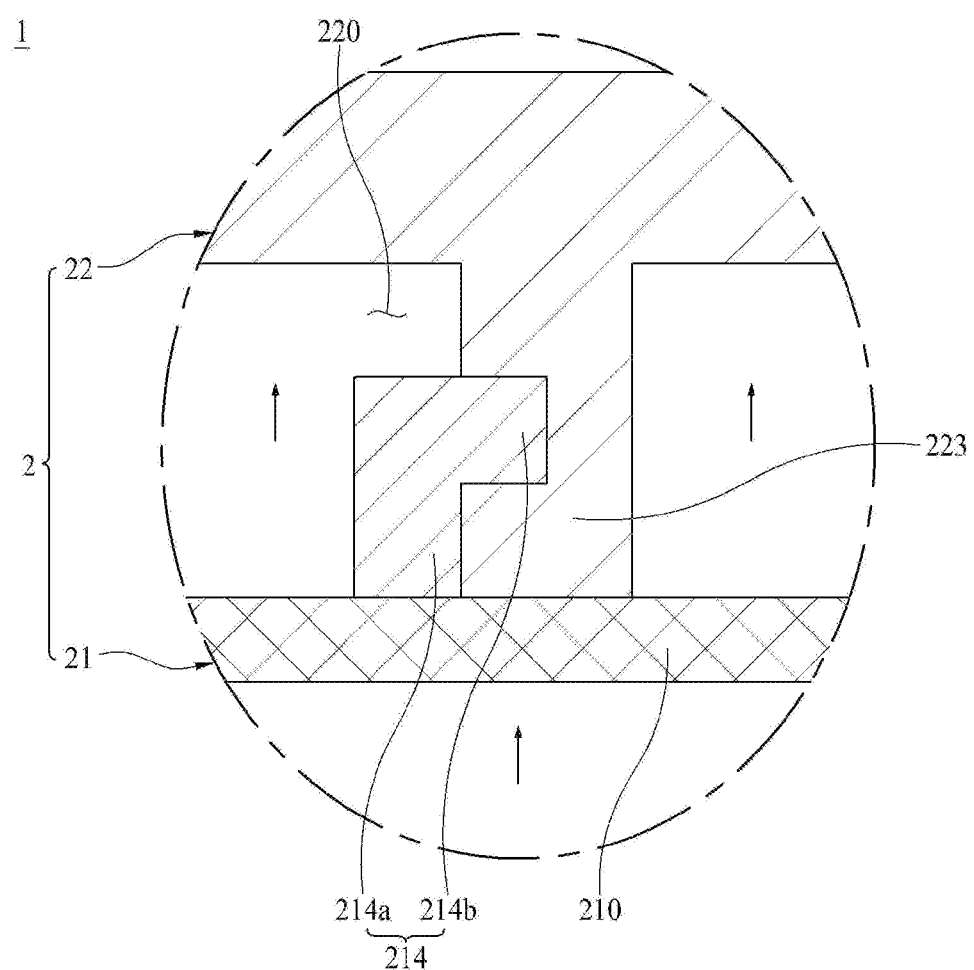
[FIG. 8]

[FIG. 9]
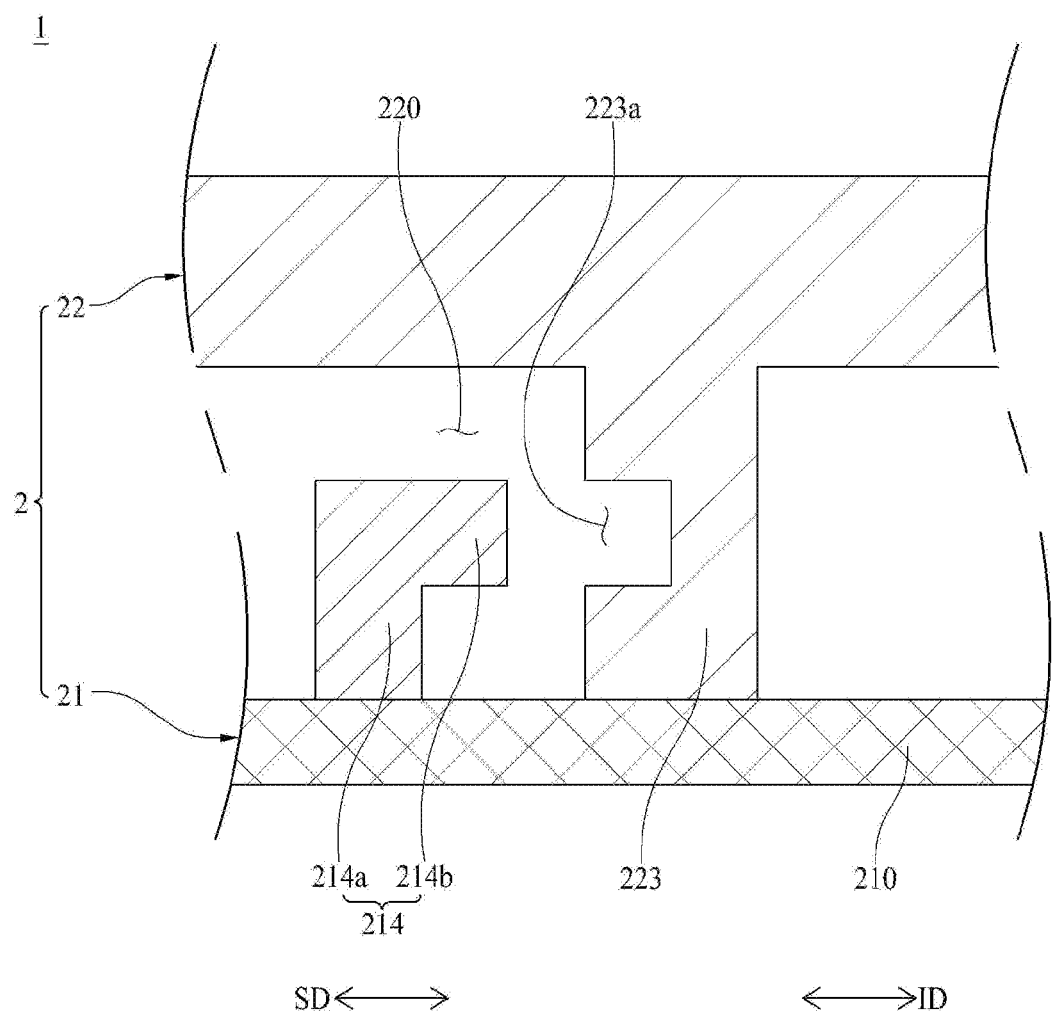

【FIG. 10】
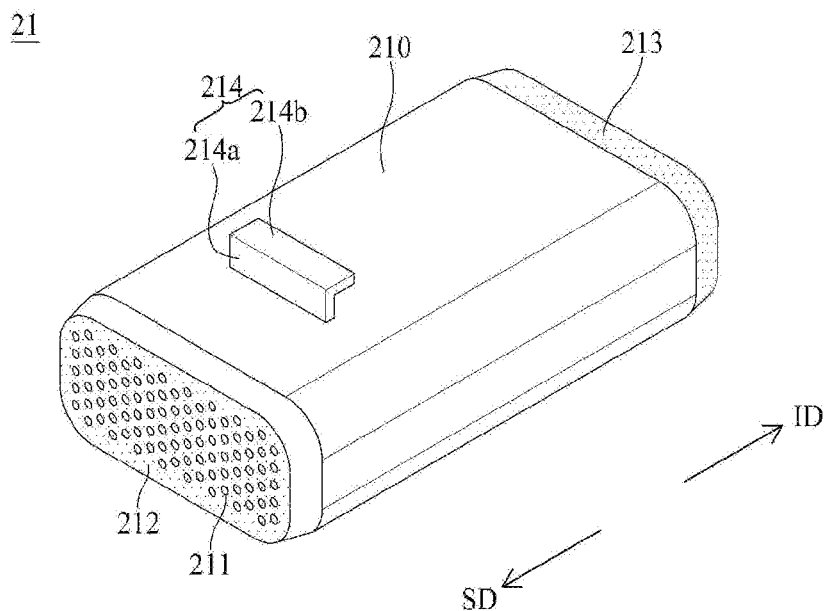
【FIG. 11】
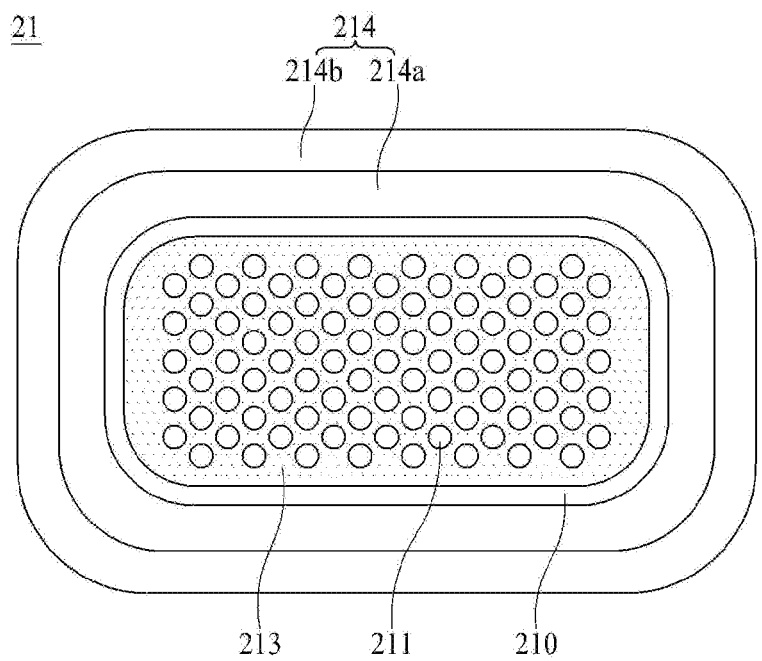

【FIG. 12】
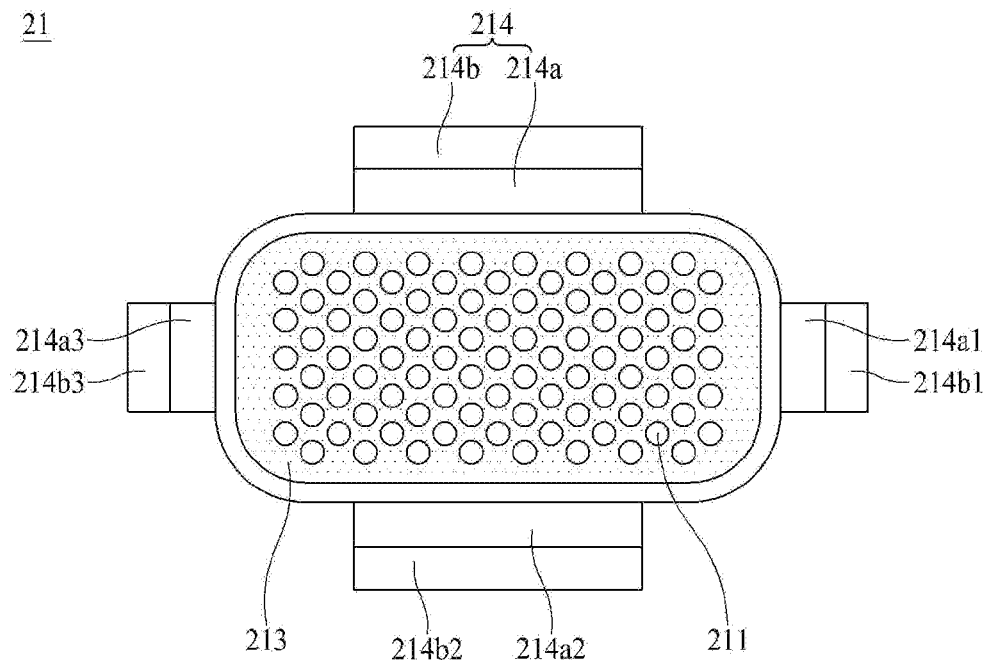
【FIG. 13】
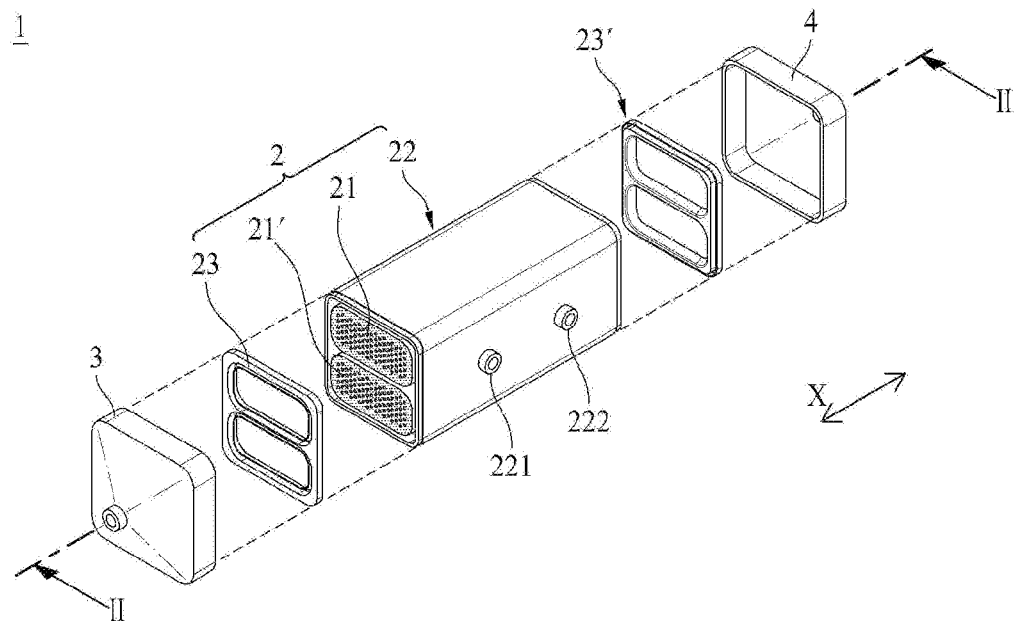

[FIG. 14]
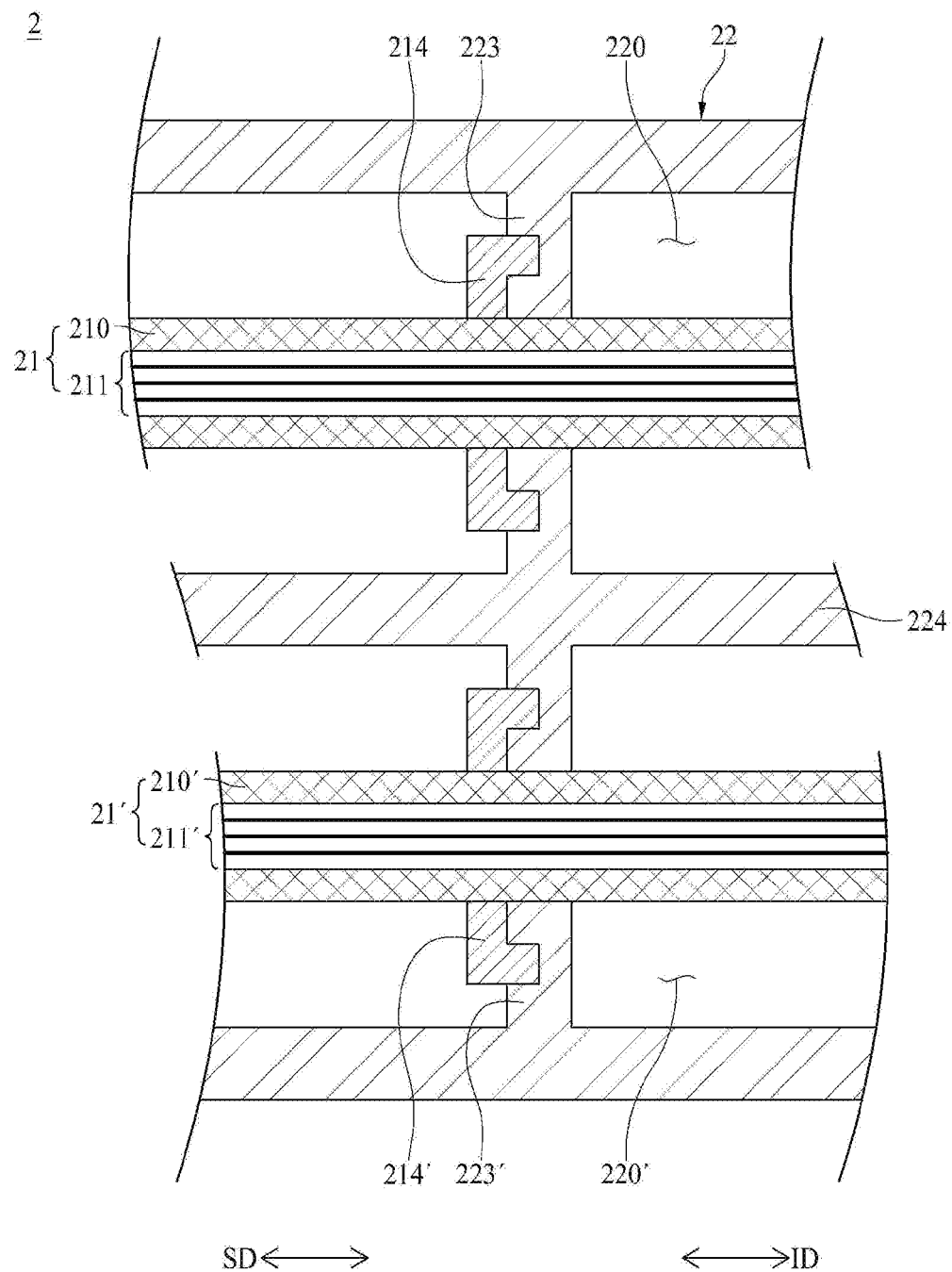

【FIG. 15】
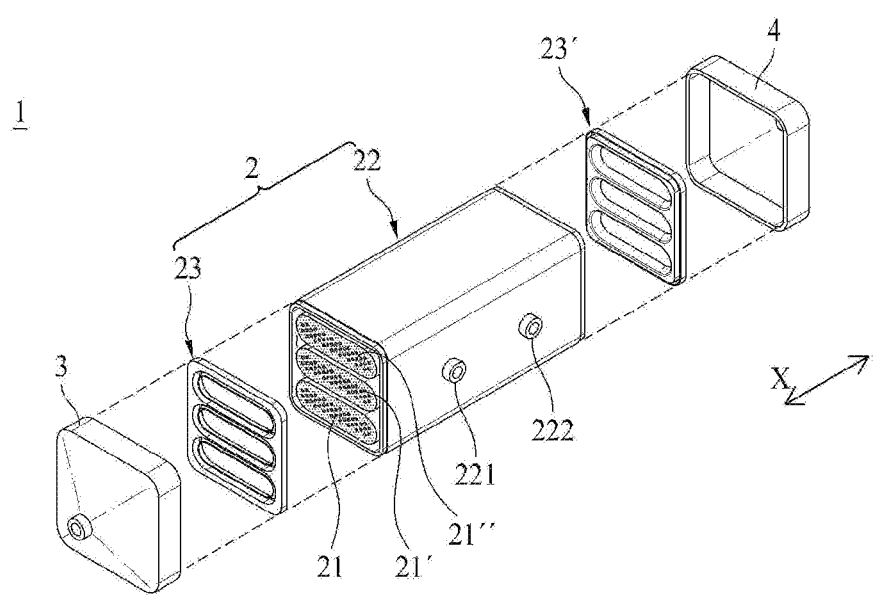

CARTRIDGE OF FUEL CELL HUMIDIFIER AND FUEL CELL HUMIDIFIER

CROSS REFERENCE TO RELATED APPLICATIONS

This application is a National Stage of International Application No. PCT/KR2020/017071 filed Nov. 27, 2020, claiming priority to Korean Patent Application No. 10-2019-0156901 filed Nov. 29, 2019, the disclosures of which is incorporated herein by reference in its entirety.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 1200 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method. The fixing layers 113, in which opposite ends of the hollow fiber membranes 112 are potted, and resin layers 114 provided between the fixing layers 113 and the mid-case 111 isolate the inner spaces of the caps 120 from the inner space of the mid-case 111. Similarly to the fixing layers 113, each of the resin layers 114 is generally formed by hardening a liquid polymer, such as liquid polyurethane resin, using a casting method.

Air supplied from the outside flows along hollow parts of the hollow fiber membranes 112. Off-gas introduced into the mid-case 111 through the off-gas inlet 111a comes into contact with the outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollow parts of the hollow fiber membranes 112.

During this humidification process, the off-gas introduced into the mid-case 111 flows at a considerable pressure, whereby the mid-case 111 expands outwards. As a result, a large space, through which the off-gas may pass, is formed between the mid-case 111 and the hollow fiber membranes 112. Consequently, the flow rate of off-gas that is immediately discharged from the mid-case 111 without contact with the outer surfaces of the hollow fiber membranes 112 after being introduced into the mid-case 111 is increased, whereby efficiency of the humidification process is lowered. In addition, air to be supplied to the fuel cell stack is not sufficiently humidified due to lowering in efficiency of the humidification process, whereby power generation efficiency of a fuel cell is lowered.

DISCLOSURE

Technical Problem

The present disclosure has been made in view of the above problems, and it is an object of the present disclosure to provide a cartridge of a humidifier for fuel cells and a humidifier for fuel cells capable of reducing the flow rate of off-gas that is bypassed without contact with the outer surfaces of hollow fiber membranes.

Technical Solution

In order to accomplish the above object, the present disclosure may include the following construction.

A humidifier for fuel cells according to the present disclosure may include a humidifying module configured to humidify dry gas supplied from outside using wet gas discharged from a fuel cell stack, a first cap coupled to one end of the humidifying module, and a second cap coupled to the other end of the humidifying module. The humidifying module may include a mid-case having an inlet configured to allow wet gas to be introduced therethrough and an outlet configured to allow the wet gas to be discharged therethrough and a cartridge disposed in the mid-case, the cartridge having a plurality of hollow fiber membranes coupled thereto. The mid-case may include a blocking member protruding toward the cartridge between the inlet and the outlet, the blocking member being configured to contact the cartridge in order to block passage of wet gas. The cartridge may include an inner case configured to receive the hollow fiber membranes and an interlocking member configured to connect the inner case to the blocking member such that the blocking member and the inner case are moved in an interlocked state depending on pressure of wet gas located between the mid-case and the inner case.

A humidifier for fuel cells according to the present disclosure may include a humidifying module configured to humidify dry gas supplied from outside using wet gas discharged from a fuel cell stack, a first cap coupled to one end of the humidifying module, and a second cap coupled to the other end of the humidifying module. The humidifying module may include a cartridge having a plurality of hollow fiber membranes coupled thereto and a mid-case having the cartridge, in plural, coupled thereto. The mid-case may include a plurality of receiving holes configured respectively to receive the cartridges and a plurality of blocking members protruding toward the receiving holes, the blocking members being configured respectively to contact the cartridges in order to block passage of wet gas. Each of the cartridges may include an inner case configured to receive the hollow fiber membranes and an interlocking member configured to connect the inner case to the blocking member such that the blocking member and the inner case are moved in an interlocked state depending on pressure of wet gas located in the receiving hole.

A cartridge of a humidifier for fuel cells according to the present disclosure may include an inner case configured to be inserted into a mid-case of a humidifier for fuel cells, a plurality of hollow fiber membranes received in the inner case, a first potting portion coupled to the inner case, the first potting portion being configured to fix one side of each of the hollow fiber membranes, a second potting portion coupled to the inner case, the second potting portion being configured to fix the other side of each of the hollow fiber membranes, and an interlocking member configured to connect the inner case to the mid-case such that the mid-case and the inner case are moved in an interlocked state depending on pressure of wet gas located in the mid-case.

Advantageous Effects

In the present disclosure, it is possible to reduce the flow rate of wet gas that is bypassed without contact with the outer surfaces of hollow fiber membranes, whereby it is possible to improve efficiency of a humidification process. Furthermore, it is possible to supply dry gas that is sufficiently humidified to a fuel cell stack, whereby it is possible to contribute to improvement in power generation efficiency of a fuel cell.

DESCRIPTION OF DRAWINGS

FIG. 2 is a schematic exploded perspective view of a humidifier for fuel cells according to the present disclosure.

FIG. 3 is a schematic exploded sectional view showing the humidifier for fuel cells according to the present disclosure, taken along line I-I of FIG. 2.

FIG. 4 is a schematic coupled sectional view showing the humidifier for fuel cells according to the present disclosure, taken along line I-I of FIG. 2.

FIGS. 5 to 8 are schematic enlarged sectional views showing part A of FIG. 4.

FIG. 9 is a schematic enlarged sectional view showing an interlocking member, taken along line I-I of FIG. 2.

FIG. 10 is a schematic perspective view of a cartridge of a humidifier for fuel cells according to the present disclosure.

FIGS. 11 and 12 are conceptual views of the cartridge of the humidifier for fuel cells according to the present disclosure, when viewed in a direction indicated by an arrow B of FIG. 10.

FIG. 13 is a schematic exploded perspective view showing an embodiment in which two cartridges are coupled to a mid-case in the humidifier for fuel cells according to the present disclosure.

FIG. 14 is a partial sectional view showing the humidifier for fuel cells according to the present disclosure, taken along line II-II of FIG. 13.

FIG. 15 is a schematic exploded perspective view showing an embodiment in which three cartridges are coupled to the mid-case in the humidifier for fuel cells according to the present disclosure.

BEST MODE

Figure 1:
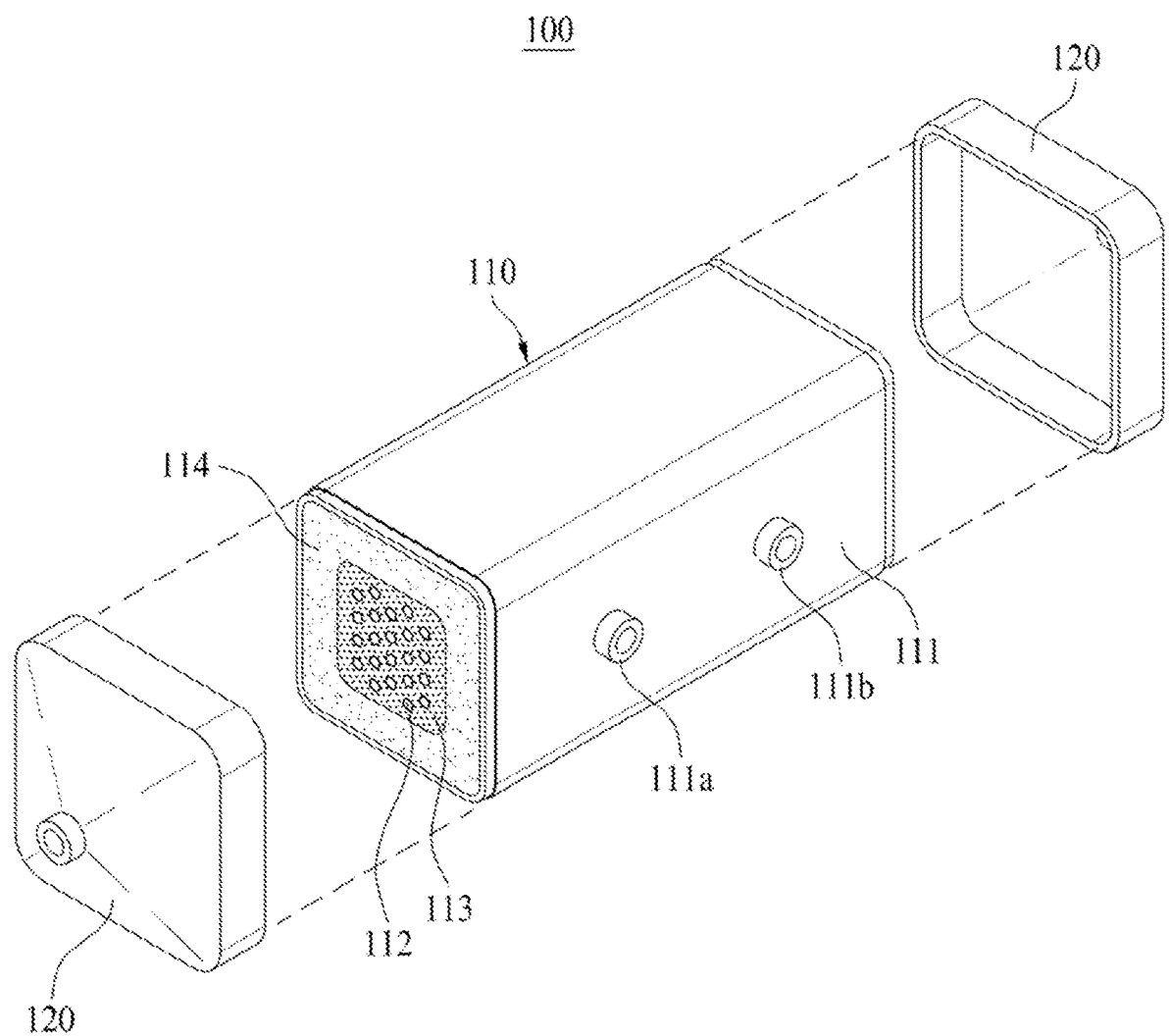
FIG. 1 is a schematic exploded perspective view of a conventional humidifier for fuel cells.

Hereinafter, embodiments of a humidifier for fuel cells according to the present disclosure will be described in detail with reference to the accompanying drawings. Since a cartridge of a humidifier for fuel cells according to the present disclosure may be included in the humidifier for fuel cells according to the present disclosure, the cartridge of the humidifier for fuel cells according to the present disclosure will be described together when describing the humidifier for fuel cells according to the present disclosure.

Referring to FIGS. 2 to 4, a humidifier 1 for fuel cells according to the present disclosure humidifies dry gas supplied from the outside using wet gas discharged from a fuel cell stack (not shown). The dry gas may be fuel gas or air. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 2 to 4, the humidifying module 2 humidifies dry gas supplied from the outside using wet gas discharged from the fuel cell stack. The first cap 3 may be coupled to one end of the humidifying module 2. The second cap 4 may be coupled to the other end of the humidifying module 2. The first cap 3 may transmit dry gas supplied from the outside to the humidifying module 2. The second cap 4 may transmit the dry gas humidified by the humidifying module 2 to the fuel cell stack. The second cap 4 may transmit dry gas supplied from the outside to the humidifying module 2, and the first cap 3 may transmit the dry gas humidified by the humidifying module 2 to the fuel cell stack.

The humidifying module 2 includes a cartridge 21 and a mid-case 22.

The cartridge 21 includes a plurality of hollow fiber membranes 211. The hollow fiber membranes 211 may be implemented as the cartridge 21 so as to be modularized. Consequently, the hollow fiber membranes 211 may be installed in the mid-case 22 through a process of coupling the cartridge 21 to the mid-case 22. In the humidifier 1 for fuel cells according to the present disclosure, therefore, ease in installation, separation, and replacement of the hollow fiber membranes 211 may be improved. The cartridge 21 may be implemented as the cartridge of the humidifier for fuel cells according to the present disclosure.

The cartridge 21 may include an inner case 210 configured to receive the hollow fiber membranes 211. The hollow fiber membranes 211 may be disposed in the inner case 210 so as to be modularized. Each of the hollow fiber membranes 211 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 21 may include a first potting portion 212. The first potting portion 212 fixes the hollow fiber membranes 211. The first potting portion 212 may fix one side of each of the hollow fiber membranes 211. In this case, the first potting portion 212 may be formed so as not to block hollow portions of the hollow fiber membranes 211. The first potting portion 212 may be formed by hardening a liquid resin, such as liquid polyurethane resin, using a casting process. The first potting portion 212 may fix the inner case 210 and one side of each of the hollow fiber membranes 211 to each other.

The cartridge 21 may include a second potting portion 213. The second potting portion 213 fixes the other side of each of the hollow fiber membranes 211. In this case, the second potting portion 213 may be formed so as not to block the hollow portions of the hollow fiber membranes 211. Consequently, dry gas may be supplied to the hollow portions of the hollow fiber membranes 211, may be humidified, and may be supplied to the fuel cell stack without being disturbed by the second potting portion 213 and the first potting portion 212. The second potting portion 213 may be formed by hardening a liquid resin, such as liquid polyurethane resin, using a casting process. The second potting portion 213 may fix the inner case 210 and the other side of each of the hollow fiber membranes 211 to each other.

The cartridge 21 is coupled to the mid-case 22. The cartridge 21 may be disposed in the mid-case 22. The mid-case 22 may include a receiving hole 220 configured to receive the cartridge 21. The receiving hole 220 may be formed through the mid-case 22 in a first-axis direction (X-axis direction). The mid-case 22 may include an inlet 221 and an outlet 222. Wet gas containing moisture may be introduced into the inner case 210 via the interior of the mid-case 22 through the inlet 221, and may then come into contact with the outer surfaces of the hollow fiber membranes 211. During this process, the moisture contained in the wet gas may be transmitted through the hollow fiber membranes 211, whereby the dry gas flowing along the hollow portions of the hollow fiber membranes 211 may be humidified. The humidified dry gas may be discharged from the hollow fiber membranes 211, and may then be supplied to the fuel cell stack. After humidifying the dry gas, the wet gas may be discharged from the inner case 210, may flow along the interior of the mid-case 22, and may be discharged from the mid-case 22 through the outlet 222. The inlet 221 may be connected to the fuel cell stack. In this case, the wet gas may be off-gas discharged from the fuel cell stack.

Meanwhile, the inner case 210 may be provided with an introduction hole 210a configured to allow the wet gas to be introduced therethrough and a discharge hole 210b configured to allow the wet gas, after humidifying the dry gas flowing along the hollow portions of the hollow fiber membranes 211, to be discharged therethrough. In this case, the wet gas may be introduced between the inner surface of the mid-case 22 and the outer surface of the cartridge 21 through the inlet 221, may be supplied into the inner case 210 through the introduction hole 210a, may come into contact with the outer surfaces of the hollow fiber membranes 211, may humidify the dry gas flowing along the hollow portions of the hollow fiber membranes 211, may be discharged between the inner surface of the mid-case 22 and the outer surface of the cartridge 21 through the discharge hole 210b, and may be discharged from the mid-case 22 through the outlet 222. A plurality of introduction holes 210a may be formed in the inner case 210. The introduction holes 210a may be disposed so as to be spaced apart from each other in the first-axis direction (X-axis direction). A plurality of discharge holes 210b may be formed in the inner case 210. The discharge holes 210b may be disposed so as to be spaced apart from each other in the first-axis direction (X-axis direction).

The humidifying module 2 may include a packing member 23.

The packing member 23 hermetically seals between the cartridge 21 and the mid-case 22. The packing member 23 may be airtightly coupled to at least one end of the humidifying module 2 through mechanical assembly. Consequently, the packing member 23 allows the first cap to fluidly communicate with only the hollow fiber membranes 112. Consequently, the packing member 23 may prevent direct mixing between dry gas to be supplied to the fuel cell stack and wet gas supplied into the mid-case 22. The packing member 23 may be inserted between the cartridge 21 and the mid-case 22. In this case, the cartridge 21 may be inserted into a passing hole 23a formed in the packing member 23. The packing member 23 may contact each of an inner wall of the mid-case 22, an outer wall of the cartridge 21, and the first potting portion 212. Through such contact, the packing member 23 may be airtightly coupled to one end of the humidifying module 2. In this case, the packing member 23 may contact each of a portion of the inner wall of the mid-case 22, a portion of the outer wall of the cartridge 21, and a portion of the first potting portion 212.

The humidifier 1 for fuel cells according to the present disclosure may include a plurality of packing members 23. The packing members 23 and 23' may be airtightly coupled to opposite ends of the humidifying module 2, respectively. In this case, the packing members 23 and 23' may be disposed at opposite sides of the cartridge 21. The packing member 23' may contact each of the inner wall of the mid-case 22, the outer wall of the cartridge 21, and the second potting portion 213, whereby the packing member 23' may be airtightly coupled to the other end of the humidifying module 2. In this case, the packing member 23' may contact each of a portion of the inner wall of the mid-case 22, a portion of the outer wall of the cartridge 21, and a portion of the second potting portion 213. A passing hole 23a' may be formed in the packing member 23'. The packing members and 23' may be implemented so as to have the same structure except that the positions thereof are different from each other.

Although not shown, the humidifier 1 for fuel cells according to the present disclosure may be implemented such that resin layers are formed at opposite sides of the cartridge 21 instead of the packing members 23 and 23'. The resin layers may be formed by hardening a liquid polymer, such as liquid polyurethane resin, using a casting method.

Referring to FIGS. 2 to 4, the first cap 3 is coupled to one end of the humidifying module 2. The space between the first cap 3 and the cartridge 21 may be isolated from the space between the cartridge 21 and the mid-case 22 in a hermetically sealed state by the packing member 23 or the resin layer.

Referring to FIGS. 2 to 4, the second cap 4 is coupled to the other end of the humidifying module 2. The space between the second cap 4 and the cartridge 21 may be isolated from the space between the cartridge 21 and the mid-case 22 in a hermetically sealed state by the packing member 23' or the resin layer.

Referring to FIGS. 2 to 8, the humidifier 1 for fuel cells according to the present disclosure may be implemented as follows in order to reduce the flow rate of wet gas that is bypassed without contact with the outer surfaces of the hollow fiber membranes 211.

The mid-case 22 may include a blocking member 223.

The blocking member 223 blocks passage of wet gas. The blocking member 223 may protrude toward the receiving hole 220 so as to contact the cartridge 21 disposed in the receiving hole 220. The blocking member 223 may protrude toward the cartridge 21 between the inlet 221 and the outlet 222 so as to contact the cartridge 21. In the humidifier 1 for fuel cells according to the present disclosure, therefore, it is possible to reduce the flow rate of wet gas that is bypassed to the outlet 222 immediately after being supplied into the mid-case 22 through the inlet 221. The blocking member 223 may contact the inner case 210 of the cartridge 21. In this case, the blocking member 223 may contact the inner case 210 between the introduction hole 210a and the discharge hole 210b formed in the inner case 210. In the humidifier 1 for fuel cells according to the present disclosure, therefore, it is possible to reduce the flow rate of wet gas that is bypassed through the space between the blocking member 223 and the inner case 210. The blocking member 223 and the mid-case 22 may be integrally formed.

Here, the wet gas performs a humidification process while flowing at a considerable pressure. Consequently, the mid-case 22 and the inner case 210 may expand outwards depending on the pressure of the wet gas. In this case, since the mid-case 22 and the inner case 210 expand at different rates of expansion due to a difference in material therebetween, the blocking member 223 may be spaced apart from the inner case 210, as shown in FIG. 6. As a result, the flow rate of the wet gas that is bypassed without contact with the outer surfaces of the hollow fiber membranes 211 may be increased.

In order to prevent the blocking member 223 and the inner case 210 from being spaced apart from each other, as described above, the cartridge 21 may include an interlocking member 214.

The interlocking member 214 connects the inner case 210 to the blocking member 223. Due to the interlocking member 214, the blocking member 223 and the inner case 210 may move in an interlocked state depending on the pressure of the wet gas. For example, as shown in FIG. 8, when the mid-case 22 and the inner case 210 expand outwards as the pressure of the wet gas is increased, the interlocking member 214 may connect the mid-case 22 and the inner case 210 to each other such that the mid-case 22 and the inner case 210 move outwards by the same distance. In this case, when the mid-case 22 expands more than the inner case 210, the inner case 210 may be pulled by the mid-case 22 via the interlocking member 214, whereby the inner case 210 may further expand outwards. In the humidifier 1 for fuel cells according to the present disclosure, therefore, the blocking member 223 may remain in contact with the inner case 210 even though the mid-case 22 and the inner case 210 expand outwards depending on the pressure of the wet gas. In the humidifier 1 for fuel cells according to the present disclosure, therefore, it is possible to reduce the flow rate of the wet gas that is bypassed without contact with the outer surfaces of the hollow fiber membranes 211, whereby it is possible to improve the efficiency of the humidification process. Furthermore, in the humidifier 1 for fuel cells according to the present disclosure, dry gas that is sufficiently humidified may be supplied to the fuel cell stack, whereby it is possible to contribute to improvement in power generation efficiency of a fuel cell.

Referring to FIGS. 9 to 12, the interlocking member 214 may include a coupling member 214a and a catching member 214b.

The coupling member 214a is coupled to each of the inner case 210 and the catching member 214b. The coupling member 214a may protrude from the outer surface of the inner case 210. Consequently, the coupling member 214a and the blocking member 223 may be disposed so as to partially or entirely overlap each other. The coupling member 214a may be disposed so as to protrude from the outer surface of the inner case 210 toward the receiving hole 220 when the cartridge 21 is inserted into the receiving hole 220. The coupling member 214a and the inner case 210 may be integrally formed.

The catching member 214b is inserted into a catching groove 223a (shown in FIG. 9) formed in the blocking member 223. When the catching member 214b is inserted into the catching groove 223a, the interlocking member 214 and the blocking member 223 may be interlocked by catching so as to move together. The catching member 214b may protrude from the coupling member 214a. The catching member 214b may be disposed so as to be spaced apart from the inner case 210. When the catching member 214b is inserted into the catching groove 223a, therefore, the blocking member 223 may be inserted between the catching member 214b and the inner case 210. Consequently, the force of connection between the interlocking member 214 and the blocking member 223 through catching may be increased. The catching member 214b and the coupling member 214a may be integrally formed.

The catching member 214b may protrude in an insertion direction (ID arrow direction). The insertion direction (ID arrow direction) is a direction in which the cartridge 21 is moved so as to be inserted into the mid-case 22. In this case, the cartridge 21 may be moved in a separation direction (SD arrow direction) so as to be separated from the mid-case 22. When the cartridge 21 is moved in the insertion direction (ID arrow direction) and is then disposed in the mid-case 22, the catching member 214b may be disposed at the side of the blocking member 223 in the separation direction (SD arrow direction) so as to be inserted into the catching groove 223a. In this case, the coupling member 214a may also be disposed at the side of the blocking member 223 in the separation direction (SD arrow direction). In the humidifier 1 for fuel cells according to the present disclosure, therefore, it is possible to reduce the flow rate of the wet gas that is bypassed without contact with the outer surfaces of the hollow fiber membranes 211 using the interlocking member 214 and the blocking member 223 and to secure ease in assembly of the cartridge 21 and the mid-case 22 due to the interlocking member 214 and the blocking member 223.

As shown in FIG. 11, the coupling member 214a may be formed in a ring shape extending along the periphery of the inner case 210. In this case, the catching member 214b may be formed along the coupling member 214a in a ring shape. Consequently, the catching member 214b and the coupling member 214a may be disposed so as to surround the outer surface of the inner case 210. In this case, the blocking member 223 may be formed in a ring shape corresponding to the coupling member 214a. The catching groove 223a may be formed in a ring shape corresponding to the catching member 214b. In an embodiment in which the coupling member 214a is formed in a ring shape extending along the periphery of the inner case 210, as described above, it is possible to increase the area of contact between the interlocking member 214 and the blocking member 223 for catching. In the embodiment in which the coupling member 214a is formed in a ring shape extending along the periphery of the inner case 210, therefore, it is possible to improve unity in that the inner case 210 and the mid-case 22 are moved in an interlocked state.

As shown in FIG. 10, the coupling member 214a may be partially formed at the periphery of the inner case 210. In this case, the catching member 214b may also be partially formed at the periphery of the inner case 210. In an embodiment in which coupling member 214a is partially formed at the periphery of the inner case 210, as described above, it is possible to reduce manufacturing cost and processing cost necessary to implement the inner case 210 and the mid-case 22 so as to be moved in an interlocked state.

As shown in FIG. 12, the interlocking member 214 may include a plurality of coupling members 214a. The coupling members 214a may be disposed along the periphery of the inner case 210 so as to be spaced apart from each other. The catching member 214b may be coupled to each of the coupling members 214a. In an embodiment in which the interlocking member 214 includes a plurality of coupling members 214a and a plurality of catching members 214b, as described above, it is possible to improve unity in that the inner case 210 and the mid-case 22 are moved in an interlocked state and to reduce manufacturing cost and processing cost necessary to implement the inner case 210 and the mid-case 22 so as to be moved in an interlocked state. Meanwhile, FIG. 12 shows that the interlocking member 214 includes four coupling members 214a, 214a1, 214a2, and 214a3 and four catching members 214b, 214b1, 214b2, and 214b3. However, the present disclosure is not limited thereto. The interlocking member 214 may include two, three, or five or more coupling members 214a and two, three, or five or more catching members 214b. Meanwhile, FIG. 12 shows that the interlocking member 214 includes coupling members 214a protruding in different directions. However, the present disclosure is not limited thereto. The interlocking member 214 may be implemented so as to include coupling members 214a disposed so as to be spaced apart from each other while protruding in the same direction.

Referring to FIGS. 13 and 14, the humidifier 1 for fuel cells according to the present disclosure may be implemented such that a plurality of cartridges 21 and 21' is coupled to the mid-case 22. In this case, the mid-case 22 may include a plurality of receiving holes 220 and 220' configured respectively to receive the cartridges 21 and 21' and a plurality of blocking members 223 and 223' protruding respectively toward the receiving holes 220 and 220' so as to contact the cartridges 21 and 21' in order to block passage of wet gas. The cartridges and 21' may include a plurality of interlocking members 214 and 214' configured to connect the inner cases 210 and 210' to the blocking members 223 and 223' such that the inner cases 210 and 210' and the blocking members 223 and 223' are moved in an interlocked state. Each of the interlocking members 214 and 214' may include the coupling member 214a (shown in FIG. 9) and the catching member 214b (shown in FIG. 9). In this case, the catching groove 223a (shown in FIG. 9) may be formed in each of the blocking members 223 and 223'. Meanwhile, the mid-case 22 may include a partition member 224 (shown in FIG. 14) disposed between the receiving holes 220 and 220'. The blocking members 223 and 223' may also be formed at the partition member 224.

FIGS. 13 and 14 show that two cartridges 21 and 21' are coupled to the mid-case 22. However, the present disclosure is not limited thereto. As shown in FIG. 15, the humidifier 1 for fuel cells according to the present disclosure may be implemented such that three cartridges 21, 21', and 21" are coupled to the mid-case 22. Although not shown, the humidifier 1 for fuel cells according to the present disclosure may be implemented such that four or more cartridges 21 are coupled to the mid-case 22. In this case, the number of receiving holes 220, blocking members 223, partition members 224, and interlocking members 214 may be increased in proportion to the number of cartridges 21 coupled to the mid-case 22.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:
1. A humidifier for fuel cells, the humidifier comprising:
a humidifying module configured to humidify dry gas supplied from outside using wet gas discharged from a fuel cell stack;
a first cap coupled to one end of the humidifying module; and a second cap coupled to the other end of the humidifying module, wherein the humidifying module comprises: a mid-case having an inlet configured to allow wet gas to be introduced therethrough and an outlet configured to allow the wet gas to be discharged therethrough; and a cartridge disposed in the mid-case, the cartridge having a plurality of hollow fiber membranes coupled thereto, the mid-case comprises a blocking member protruding toward the cartridge between the inlet and the outlet, the blocking member being configured to contact the cartridge in order to block passage of wet gas, and the cartridge comprises: an inner case configured to receive the hollow fiber membranes; and an interlocking member configured to connect the inner case to the blocking member such that the blocking member and the inner case are moved in an interlocked state depending on pressure of wet gas located between the mid-case and the inner case.

2. The humidifier according to claim 1, wherein the blocking member comprises a catching groove configured to allow the interlocking member to be inserted thereinto, and the interlocking member comprises:

a catching member configured to be inserted into the catching groove; and a coupling member coupled to each of the catching member and the inner case such that the inner case is moved together as the catching member is moved while being interlocked with the blocking member in a state in which the catching member is inserted into the catching groove.

3. The humidifier according to claim 2, wherein the coupling member is formed in a ring shape extending along a periphery of the inner case, and the catching member is formed along the coupling member in a ring shape.

4. The humidifier according to claim 2, wherein the interlocking member comprises the coupling member in plural, the coupling members are disposed along a periphery of the inner case so as to be spaced apart from each other, and the catching member is coupled to each of the coupling members.

5. The humidifier according to claim 2, wherein the cartridge is moved in an insertion direction so as to be disposed in the mid-case and is moved in a separation direction opposite the insertion direction so as to be separated from the mid-case, the catching member is disposed at a side of the blocking member in the separation direction so as to be inserted into the catching groove.

6. The humidifier according to claim 1, further comprising a packing member airtightly coupled to at least one end of the humidifying module through mechanical assembly such that the first cap fluidly communicates with only the hollow fiber membranes.

7. The humidifier according to claim 6, wherein the cartridge comprises a first potting portion configured to fix the hollow fiber membranes, and the packing member contacts each of an inner wall of the mid-case, an outer wall of the cartridge, and the first potting portion.

8. A humidifier for fuel cells, the humidifier comprising:

a humidifying module configured to humidify dry gas supplied from outside using wet gas discharged from a fuel cell stack;

a first cap coupled to one end of the humidifying module; and a second cap coupled to the other end of the humidifying module, wherein the humidifying module comprises: a cartridge having a plurality of hollow fiber membranes coupled thereto; and a mid-case having the cartridge, in plural, coupled thereto, the mid-case comprises: a plurality of receiving holes configured respectively to receive the cartridges; and a plurality of blocking members protruding toward the receiving holes, the blocking members being configured respectively to contact the cartridges in order to block passage of wet gas, and each of the cartridges comprises: an inner case configured to receive the hollow fiber membranes; and an interlocking member configured to connect the inner case to the blocking member such that the blocking member and the inner case are moved in an interlocked state depending on pressure of wet gas located in the receiving hole.

9. The humidifier according to claim 8, wherein each of the blocking members comprises a catching groove configured to allow the interlocking member to be inserted thereinto, and each of the interlocking members comprises:

a catching member configured to be inserted into the catching groove; and a coupling member coupled to each of the catching member and the inner case such that the inner case is moved together as the catching member is moved while being interlocked with the blocking member in a state in which the catching member is inserted into the catching groove.

10. The humidifier according to claim 8, further comprising a packing member airtightly coupled to at least one end of the humidifying module through mechanical assembly such that the first cap fluidly communicates with only the hollow fiber membranes.

11. A cartridge of a humidifier for fuel cells, the cartridge comprising:

an inner case configured to be inserted into a mid-case of a humidifier for fuel cells configured to humidify dry gas supplied from outside using wet gas discharged from a fuel cell stack;

a plurality of hollow fiber membranes received in the inner case;

a first potting portion coupled to the inner case, the first potting portion being configured to fix one side of each of the hollow fiber membranes;

a second potting portion coupled to the inner case, the second potting portion being configured to fix the other side of each of the hollow fiber membranes; and an interlocking member configured to connect the inner case to the mid-case such that the mid-case and the inner case are moved in an interlocked state depending on pressure of wet gas located in the mid-case.

12. The cartridge according to claim 11, wherein the interlocking member comprises:

a catching member configured to be inserted into a catching groove formed in the mid-case; and a coupling member coupled to each of the catching member and the inner case such that the inner case is moved together as the catching member is moved while being interlocked with the mid-case in a state in which the catching member is inserted into the catching groove.

13. The cartridge according to claim 12, wherein the coupling member is formed in a ring shape extending along a periphery of the inner case, and the catching member is formed along the coupling member in a ring shape.

14. The cartridge according to claim 12, wherein the interlocking member comprises the coupling member in plural, the coupling members are disposed along a periphery of the inner case so as to be spaced apart from each other, and the catching member is coupled to each of the coupling members.

15. The cartridge according to claim 12, wherein the catching member protrudes from the coupling member in an insertion direction in which the inner case is inserted into the mid-case.

\* \* \* \* \*